(12) United States Patent
Perrin

(10) Patent No.: US 8,793,284 B2
(45) Date of Patent: Jul. 29, 2014

(54) ELECTRONIC DEVICE WITH REVERSING STACK DATA CONTAINER AND RELATED METHODS

(76) Inventor: Laurie Dean Perrin, Port Williams (CA)

(*) Notice: Subject to any disclaimer, the term of this patent is extended or adjusted under 35 U.S.C. 154(b) by 78 days.

(21) Appl. No.: 13/479,963

(22) Filed: May 24, 2012

(65) Prior Publication Data

US 2012/0303911 A1 Nov. 29, 2012

Related U.S. Application Data

(60) Provisional application No. 61/490,102, filed on May 26, 2011.

(51) Int. Cl.
*G06F 7/00* (2006.01)
*G06F 17/30* (2006.01)

(52) U.S. Cl.
CPC ...... *G06F 17/3007* (2013.01); *G06F 17/30091* (2013.01); *G06F 17/30312* (2013.01)
USPC .......................................... 707/801; 707/812

(58) Field of Classification Search
CPC ....... G06F 7/00; G06F 17/30; G06F 17/3007; G06F 17/30091; G06F 17/30312
See application file for complete search history.

(56) References Cited

U.S. PATENT DOCUMENTS

| | | | |
|---|---|---|---|
| 3,810,117 A | 5/1974 | Healey | |
| 4,592,019 A * | 5/1986 | Huang et al. | 365/189.05 |
| 4,628,477 A * | 12/1986 | Burrows | 711/219 |
| 4,751,675 A * | 6/1988 | Knauer | 365/78 |
| 5,287,309 A | 2/1994 | Kai | |
| 5,628,016 A | 5/1997 | Kukol | |
| 5,687,336 A | 11/1997 | Shen et al. | |
| 5,818,873 A | 10/1998 | Wall et al. | |
| 6,449,709 B1 * | 9/2002 | Gates | 712/202 |
| 6,550,058 B1 | 4/2003 | Wynn | |
| 7,000,234 B1 * | 2/2006 | Shavit et al. | 719/315 |
| 7,152,153 B2 | 12/2006 | Hummel et al. | |
| 2002/0099932 A1 | 7/2002 | Muro, Jr. | |
| 2008/0189646 A1 | 8/2008 | Bohle | |

OTHER PUBLICATIONS

Tsigas et al., "A Simple, Fast and Scalable Non-Blocking Concurrent FIFO Queue for Shared Memory Multiprocessor Systems", SPAA '01, pp. 134-143, 2001, ACM.*
Sundell et al., "A Lock-Free Algorithm for Concurrent Bags", SPAA '11, pp. 335-344, 2011, ACM.*
Cook, "Reverse Execution of Java Bytecode," The Computer Journal, vol. 45, No. 6, May 13, 2002, pp. 608-619.
Salamat et al, "Reverse Stack Execution in a Multi-Variant Execution Environment," Department of Computer Science, School of Information and Computer Sciences, University of California, Irvine, Jun. 19, 2008, 6 pages.

* cited by examiner

*Primary Examiner* — Michael Hicks
(74) *Attorney, Agent, or Firm* — Allen, Dyer, Doppelt, Milbrath & Gilchrist, P.A.

(57) ABSTRACT

An electronic device may include a memory, and a processor coupled to the memory for storing and accessing data in the memory. The processor may arrange the data in a stack data container including values extending from a stack top to a stack bottom, operate the stack data container in first and second modes of operation, and while in the first mode of operation, push and pop a respective value from the stack top of the stack data container. The processor may also while in the second mode, reverse an orientation of the stack data container and the values therein, and push and pop a respective value from the stack bottom of the reversed stack data container.

20 Claims, 10 Drawing Sheets

ELECTRONIC DEVICE WITH REVERSING STACK DATA CONTAINER AND RELATED METHODS

RELATED APPLICATION

This application is based upon prior filed provisional application Ser. No. 61/490,102 filed May 26, 2011, the entire subject matter of which is incorporated herein by reference in its entirety.

FIELD OF THE INVENTION

The present invention relates to the field of data management, and, more particularly, to data structure management and related methods.

BACKGROUND OF THE INVENTION

In today's computer driven world, the creation and development of efficient and robust software has become an important focus and a commercially lucrative industry. A large majority of our personal and business conduct relies upon creation of effective software. As such, a premium is placed on the development of computer programs that run quickly and smoothly. The creation of any efficiency in programming computer programs can yield numerous competitive advantages. This remains true despite the fact that processor speeds have increased, as well as the memory of computers (random access memory, commonly referred to as "RAM").

One manner of creating efficiencies that relates to how a computer program performs is through certain software algorithms, which help manage the various data used and accessed by the underlying programs. Commonly categorized as "data containers," or data structured, these algorithms facilitate data management. Effective data management minimizes the amount of time a computer program spends manipulating RAM, which thus increases the speed and efficiency of the underlying software. With the complexity of today's programs and underlying architecture, data management has become a key consideration when creating new computer programs.

One key consideration in data management is the utilization of effective data containers. Most strongly typed computer languages (software languages readable by both humans and machines), such as C+ or C++ use various types of data containers. The most basic type of data container is the array. In its most basic form, an array is a contiguous section of computer memory (i.e., RAM) reserved for maintaining discrete, constituent elements (a single data member within an array). Such an array can be dynamically populated, yet the maximum number of elements cannot change during execution of the underlying program. Alternatively (and frequently), an array is fixed in size by the software programmer.

Generic containers represent one form of data container well suited to a variety of computer programs written in strongly typed programming languages. Generic containers typically used by programmers of these languages include (but are in no way limited to) vectors, lists, stacks and queues. With a stack form of generic container, elements can be stored or referenced with an array. Stack elements are retrieved in "last-in first-out" (LIFO) order. Put another way, the last element added to the array is the first removed—while the first element placed into the array is the last element removed. These various generic containers can be used for different purposes and different applications within a computer program. Effective use of these will maximize efficient use of data.

Strongly typed computer languages typically bundle libraries that include standardized sets of generic containers. These containers are typically implemented with variables, data structures, and arrays. Such containers differ based upon the underlying operations they provide and also by their performance characteristics. Performance of these generic containers often dramatically affects the performance of the client software.

Of all of the various generic containers, those containers, commonly referred to as "stack" containers, frequently afford a software programmer the most effective mechanism to collect and employ data. In such cases, stacks allow for the best mechanism to retrieve and use elements—through the last in and first out order. The operation of placing an element upon a stack is referred to as a "push," while removing an element from the stack is called a "pop."

With the advancement of information technology, computer systems now use multi-tasking operating systems. Moreover, multi-tasking has evolved into "multi-threading," where a software program executes in multiple, concurrent paths of execution and shares computing resources internally, not merely with other programs. Multi-tasking operating systems often may require programs to use resources.

One primary advantage of multi-tasking is the ability to have concurrency, that is, to perform several tasks at once. Similarly, a multi-threaded computer program has one or more threads whose execution transpires in a shared execution environment. One benefit of concurrency is a reduction in idle time. For instance, when one thread of execution is busy—perhaps it is waiting for one or more events to occur other threads can continue to execute and therefore make more productive use of the computer processor. By eliminating idle time, concurrency leads to an overall increased speed of processing.

One challenge inherent in multi-threaded computer programming is the management of the various threads during key points of execution by one or more processors. Coordination of these various threads when executing a program, in particular at points where data containers are shared by multiple threads is referred to as "synchronization." Synchronizing one or more threads involves their waiting for a set of conditions to arise, perhaps through processing performed by one or more additional threads or by the host operating system. Data involved in these conditions are safeguarded from conflicting operations through acquisition of a synchronization object—often referred to as a "lock."

With contemporary computer hardware, operating systems may temporarily interrupt execution of a thread. These interruptions and resumptions occur as part of "scheduling." Scheduling is performed by the underlying operating system, and controls when various threads are given the opportunity to execute. Note that the software programmer has little or no means of predicting when these interruptions will occur.

Because of the complexities surrounding multi-threaded programming, many computer programmers choose an approach to minimize the complexity of their computer programs (and thus often fail to maximize the performance of the resulting software). This approach includes simply avoiding the use of threads. Another approach is to overuse locks (and thereby increase the idle time of any processors executing the program). Moreover, the uncertainty as to how these various locking mechanisms impact the performance of software—and perhaps lead to software bugs—has caused programmers to seek new techniques that might help address the issue of multi-threaded software performance and complexity.

Although different types of locking mechanisms have been developed in order to help accommodate issues and limitations faced by software developers, a more robust alternative may be desirable in the field of computer programming. Put another way, there may be a desire need in the field of data management for a system that may minimize delays on the part of threads as they process a given data-set by reducing the need for locking.

SUMMARY OF THE INVENTION

In view of the foregoing background, it is therefore an object of the present invention to provide a stack data container that is efficient and robust.

This and other objects, features, and advantages in accordance with the present invention are provided by an electronic device comprising a memory, and a processor coupled to the memory for storing and accessing data in the memory. The processor may be utilized for arranging the data in a stack data container comprising a plurality of values extending from a stack top to a stack bottom, operating the stack data container in first and second modes of operation, and while in the first mode of operation, pushing and popping a respective value from the stack top of the stack data container. The processor may be employed while in the second mode, reversing an orientation of the stack data container and the plurality of values therein, and pushing and popping a respective value from the stack bottom of the reversed stack data container. Advantageously, the electronic device may provide a data container that is more flexible than typical data containers.

More specifically, the processor may reverse the stack data container a plurality of times. The processor may store a first set of values in the stack data container before a first reversal, and succeeding the processor may subsequently retrieve the first set of values based upon a last-in and first-out (LIFO) out protocol.

Additionally, the processor may store a second set of values in the stack data container between the second reversal and a second reversal different from the first reversal, and succeeding the processor may retrieve values from the second set of values based upon a first-in first-out (FIFO) protocol.

The processor may store and maintain a plurality of variables associated with a current orientation of the stack data container. The plurality of variables may comprise first and second pairs of indices for indicating location of recent pushed and popped values for the first and second modes of operation for the stack data container.

The processor may store a first plurality of values in the stack data container during the first mode and a second plurality of values in the stack data container during the second mode, and the stack data container may include at least one empty value between the first and second pluralities of values. The processor may store the stack data container in a fixed length array in the memory. The processor may comprise a multi-processing core device, each core operating a respective thread for accessing the stack data container. Each core may access the stack data container without synchronization locks.

Another aspect is directed to a non-transitory computer-readable medium having computer-executable instructions for causing a computing device comprising a processor and associated memory to perform steps. The steps may comprise storing and accessing data in the memory, arranging the data in a stack data container comprising a plurality of values extending from a stack top to a stack bottom, and operating the stack data container in first and second modes of operation. The steps may comprise while in the first mode of operation, pushing and popping a respective value from the stack top of the stack data container, and while in the second mode, reversing an orientation of the stack data container and the plurality of values therein, and pushing and popping a respective value from the stack bottom of the reversed stack data container.

Another aspect is directed to a method of operating an electronic device comprising a memory, and a processor coupled to the memory for storing and accessing data in the memory. The method may include using the processor for arranging the data in a stack data container comprising a plurality of values extending from a stack top to a stack bottom, and operating the stack data container in first and second modes of operation. The method may also include using the processor for while in the first mode of operation, pushing and popping a respective value from the stack top of the stack data container, and while in the second mode, reversing an orientation of the stack data container and the plurality of values therein, and pushing and popping a respective value from the stack bottom of the reversed stack data container.

DETAILED DESCRIPTION OF THE PREFERRED EMBODIMENTS

Figure 1:
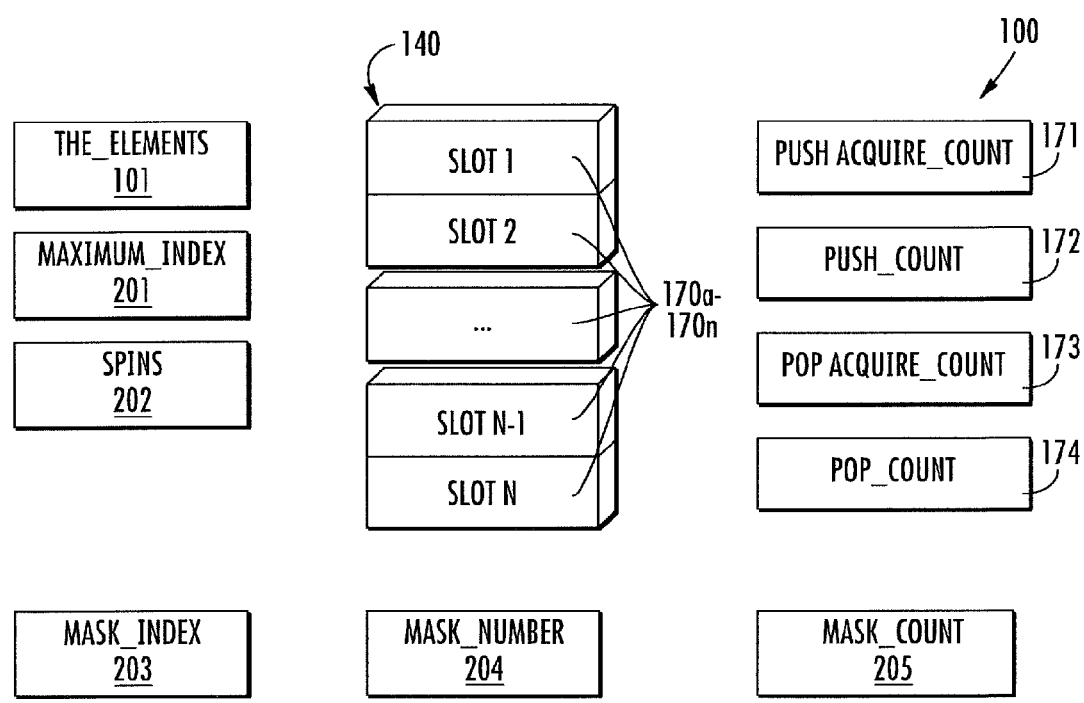
FIG. 1 is a schematic diagram showing general reversing stack implementation variables and element array, according to the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The invention solves many of the limitations found in the field of data management. More specifically, the invention is directed toward a high efficiency data management protocol that allows improved performance when implementing performance sensitive computing applications. The invention is directed to a reversing stack data container that allows for simultaneous push and pop of data elements during processing. The data container provides two modes of operation: that of FIFO and that of hybrid LIFO/FIFO. The protocol of the reversing stack includes indicators that allow for determination of the maximum number of elements, and orientation (normal operation or reverse operation), as well as various counters (push acquire count, push release count, pop acquire count, and pop release count). These indicators permit unidirectional (all array reads and writes ascending or all descending) access and modification of stack internals and, therefore, lock free operation of the data container in multi-threaded execution environments.

While performing a push or a pop operation in hybrid mode, the stack determines whether it presently operates in normal or reversed order. Based upon this determination, it either pushes/pops at the front (places/removes elements relative to the top of the stack) or alternatively pushes/pops at the back (places/removes elements relative to the bottom of the stack). Stack orientation segregates the element array into two dynamic sections—that reserved for push operations and that reserved for pop operations.

Features of embodiments of the invention include a reversing stack that provides software developers with a high-performance data container. The reversing stack has a programmer-definable capacity for storing or referencing data. Further, the reversing stack is generic, and as a result, software developers can define the type of data to be stored or referenced. The reversing stack provides the computer programmer with the ability to store or reference a programmer-definable number of data elements and retrieve them in the opposite order of their collection (LIFO). Yet further, elements of a given data-type can be added to the reversing stack via the push operation. In addition, elements of a given data type can be retrieved from the reversing stack via the pop operation. The reversing stack performs push and pop operations with extreme efficiency. The reversing stack of the present invention extends a traditional stack container with the concept of orientation/directionality. This feature changes the semantics of the reversing stack from that of a normal stack, in that data collection operations fill the stack, and once filled the stack orientation reverses. An orientation feature of the reversing stack allows data collection and retrieval operations to be performed arbitrarily while maintaining LIFO data retrieval between reversals. Data collection and retrieval operations upon the reversing stack can be performed in a multi-threaded software program without synchronization/arbitration on the part of the programmer. As a consequence, the efficiency of the reversing stack allows tens of millions of data collection and retrieval operations per second on modern personal computers, even in a multi-threaded environment.

Overview of the Reverse Stacking System

This invention is directed towards a reversible stack 100 protocol—as an improved form of data management. Such reversing stack 100 comprises a stack that adds an orientation (whether reversed or not). Such orientation allows the reversing stack 100 to partition underlying element 101 storage into two distinct and dynamic regions. The first region involves performing a push 115, while the second region 120 involves a pop 125 operation, or vice-versa depending upon orientation. As such, element 101 accesses can be performed without otherwise requisite locking on the part of a thread 200.

It is important to note that the reversing stack 100 is not strictly a LIFO container. Rather, the reversing stack 100 contemplated by the present embodiments is LIFO between reversals. More specifically, an element 101 popped off of the stack 140, is that element most recently pushed onto the stack 140 prior to the most recent reversal. Accordingly, sets of elements 101 delimited by reversals are FIFO, and the elements 101 within such a set are LIFO, relative to one another.

Re-orientation (reversal) is performed automatically by the reversing stack itself, and occurs when the stack becomes full. As automatic reversals do not require synchronization, the reversing stack may be utilized in multi-threaded computer software applications in a completely lock-free fashion (without any thread synchronization mechanisms).

Based upon the foregoing, it is contemplated that operation of the reversed stack 100 requires exclusivity (single or synchronized access) only in the case of manual re-orientation. Although pops 115 and pushes 125 need not be synchronized relative to one another, they still must be guarded relative to a manual stack reversal. Manual reversals may be performed when no elements 101 are available to be popped from the stack (i.e., the stack is empty), and meanwhile elements 101 have been pushed onto the stack since the last reversal (i.e., the stack is not reverse-empty).

Performance gains are realized from effective use of the reversing stack 100 in both single and multi-threaded applications. When employed in multi-threaded operations, performance benefits arise from the ability to push and/or pop without thread synchronization. Moreover, there is a benefit as to the compact memory requirements of the reversing stack implementation.

Here, reversing stack 100 is more efficient than various other data containers. If at most n elements are to be stored, then the memory requirements for the stack is fixed at n times the size of an element 101 (in bytes) plus a few bytes for the five state variables (explained in greater detail in FIG. 1 discussed below). During use, the reversing stack 100 does not perform dynamic memory allocation—as this would limit performance according to that of the system memory allocator (itself subject to locking issues). Moreover, by avoiding memory allocation, the reversing stack does not compete with other threads or processes for acquiring or relinquishing memory resources.

The reversing stack 100 remains useful as a high performance data container where strict LIFO semantics are not required. Being compact and memory efficient, the reversing stack 100 lends itself to—scenarios that focus on compactness as well as performance, for example, as in low-level and embedded system data management.

Although the reversing stack 100 protocol supports full concurrency (concurrent pushes, pops or both), often software applications do not need concurrency with both operations. For example, an existing usage scenario performs single-threaded pops and multi-threaded pushes for tracking internet connections. In this pattern, multi-threading specific portions of internal pop operation logic are unnecessary and may thus be omitted, further improving performance.

Implementation Details

FIG. 1 illustrates the implementation details of the reversing stack 100. As shown, the reversing stack 100 is composed of an element 101 array whose data accesses flow in alternating directions—based upon orientation. More specifically, the reversing stack 100 comprises six primary variables: a reference 101 to the element array 140, four count variables 171-174 which jointly indicate whether respective array 140 operations proceed in normal or reversed order, and a variable 201 which denotes the size of the array/data container. These six variables function to implement the reversing stack 100, so as to maximize performance of the data container.

As is further shown in FIG. 1, the three counter bitmask variables (203, 204 and 205) help orient operations upon a plurality of element slots 170a-170n (denoted as slot 1, slot 2 and as to the bottom of the array 140 slot n−1 and slot n). These slots 170a-170n store the various underlying elements 101 of the array 140. Accordingly, the reversing stack 100 also employs various counters, specifically a push acquire count 171, a push release count 172, as well as a corresponding pop acquire count 173 and a pop release count 174. These various counters and bitmasks cooperate in internal state management to track positions of the most recent added or removed element on the front, and likewise, on the back of the array. During normal orientation the push acquire count 173 is unused. During reversed orientation the pop acquire count 171 is unused.

The reversing stack 100 maintains its orientation internally; orientation is only important to the stack user insofar as they wish to manually reverse the stack 140 and it is not reverse-empty (i.e., elements reside on the push section of the stack). The reversing stack 100 thus offers the expected push 115 and pop 125 operations—as well as a test for being empty and, in hybrid mode, manually reversing the stack.

Reverse Stack Operation

Figure 2A:
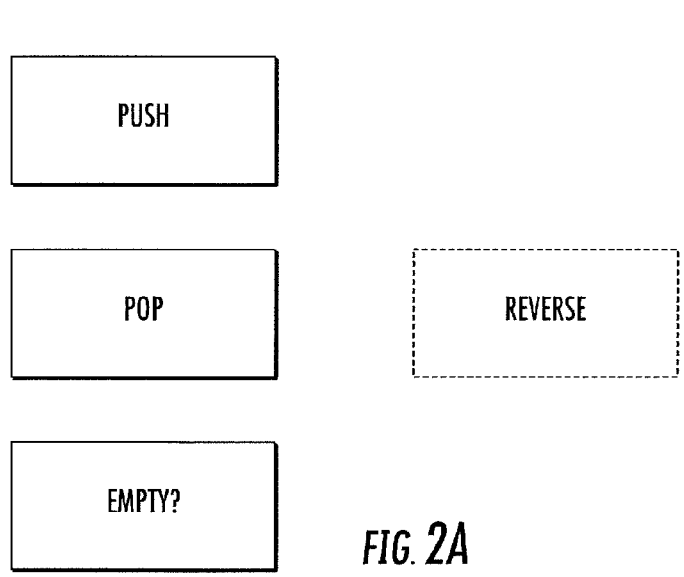
FIG. 2A is a schematic diagram showing operations expected of a stack data container, according to the present invention.
Figure 2B:
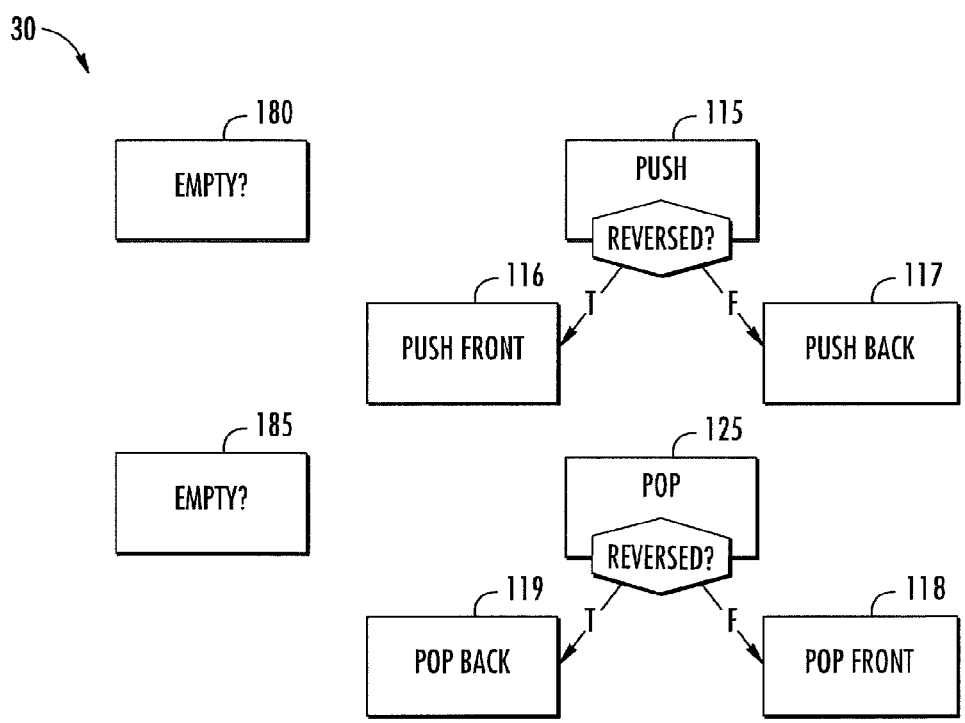
FIG. 2B is a schematic diagram showing operations of the reversing stack, according to the present invention.

Referring now to FIG. 2B, a diagram 30 provides a protocol for operation of the reversing stack 100. As shown, there is one test available while operating the reversing stack 100: (a) is the array 140 empty 180 and one directive specific to the hybrid mode of operation (b) reverse 185 the array 140 orientation. Moreover, while performing a push 115 operation, the operation determines whether orientation is in standard or reversed order. Based upon this determination, it either pushes front 116 (places elements 101 relative to the top of the array 140) or alternatively pushes back 117 (places elements 101 relative to the bottom of the array 140).

While performing a pop 125 operation, the reversing stack 100 again determines whether it is operating in standard or reversed mode. Likewise, based upon this determination, it either pops front 118 (removes elements 101 relative to the top of the array 140) or alternatively pops back 119 (removes elements 101 relative to the bottom of the array 140).

It is important to note that push 115 and pop 125 operations occur relative to opposite ends of the array, which ends are dictated by the orientation of the reversing stack 100. This allows data accesses (element 101 pops 115 and pushes 125) to proceed in a common direction (as illustrated in greater detail below in FIGS. 3 and 4). This unidirectionality allows for so-called "atomic" modification of internal state information through compare and swap (CAS) processor instructions and, therefore, lock-free operation while a data container is processed.

Orientation and Data Flow

Figure 3:
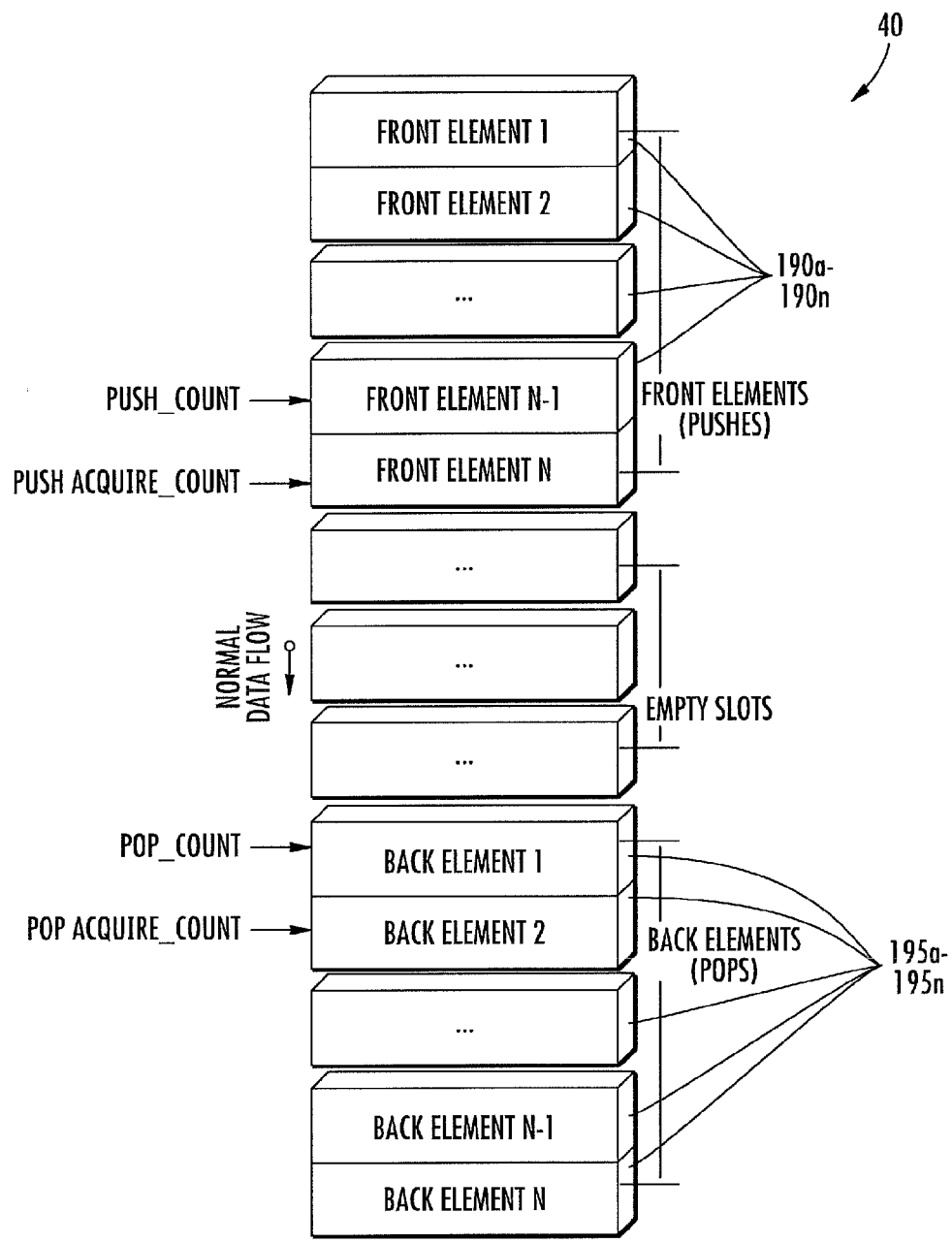
FIGS. 3-4 are schematic diagrams of orientation during normal and reverse data flow, respectively, according to the present invention.
Figure 4:
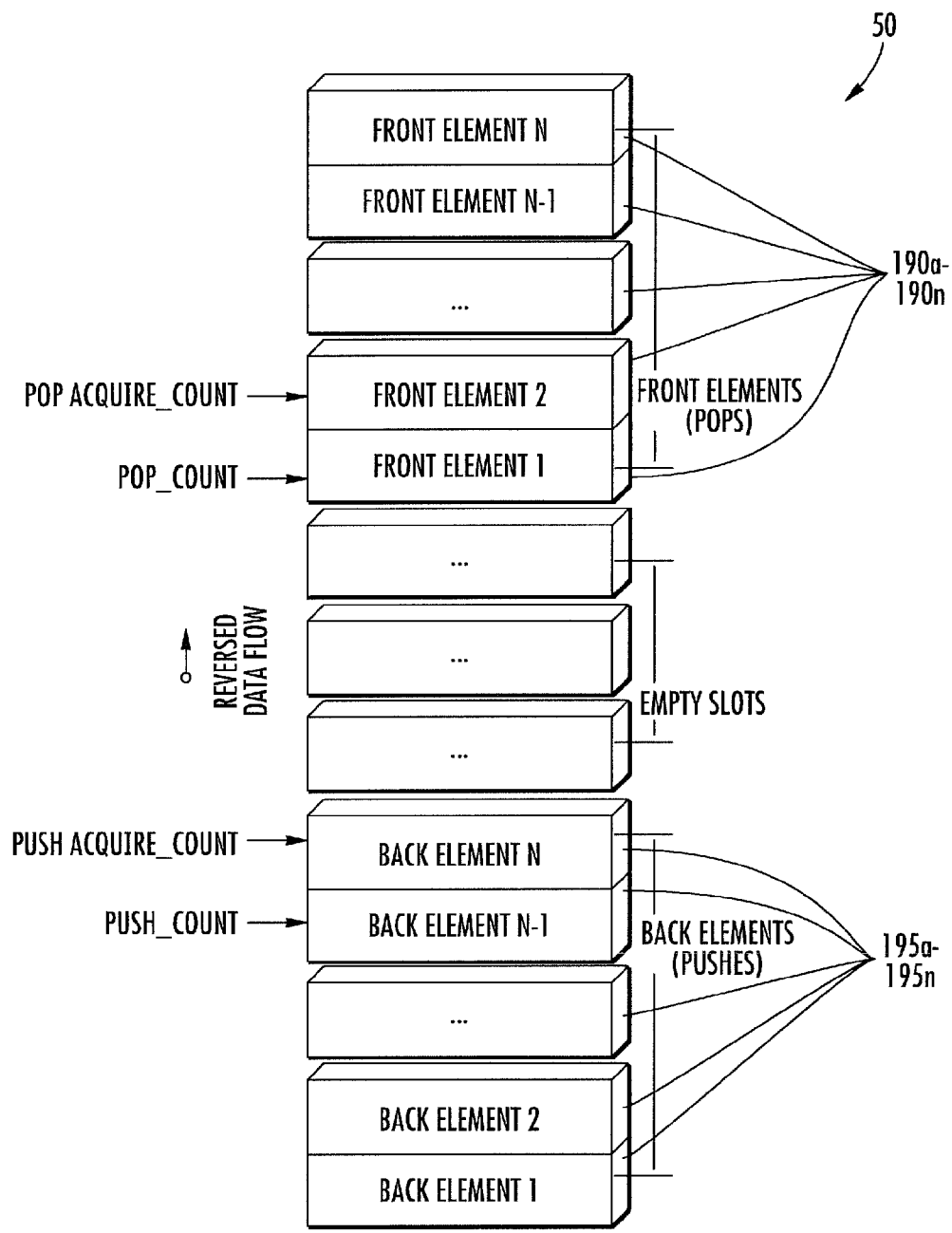

Both FIG. 3 and FIG. 4 include diagrams 40, 50 illustrating one example of how orientation and data flow for the reversing stack 100. First turning to FIG. 3, the schematic denotes normal orientation/data flow for the reversing stack 100. There are three primary conceptual divisions in the array 140: (a) front elements 190a-190n (for purposes of pops 115), (b) empty slots (increase with pops, decrease with pushes) 170a-170n, and (c) back elements 195a-195n (for purposes of containing pushed elements 125). Moreover, the reversing stack also employs the various indices (171, 172, and 174). Element numbering (1 . . . n) indicates, respectively, the order in which pops will occur and the order in which pushes have occurred.

Alternatively, FIG. 4 illustrates operation of the reversing stack 100 while in a reversed orientation/data flow. As in FIG. 3, operation in reversed data flow requires three conceptual divisions in the array 140: (a) front elements 190a-190n (for purposes of containing pushed elements), (b) empty slots (increase with pops, decrease with pushes) 170a-170n, and (c) back elements 195a-195n (for purposes of pops 125). Likewise, there is a need for use of the various indices (172, 173, and—174). Again, element numbering (1 . . . n) indicates, respectively, the order in which pops will occur and the order in which pushes have occurred.

When push and pop operations are required to be multi-threaded, the otherwise singular count variables are split into an acquire and release count pair. This is done to reserve the next element slot for a given thread, but also to prevent its value from being overwritten until after the element 101 value is recorded. The acquire count indicates the next available element 101 to be assigned, while the release count indicates where the oldest such assignment has been completed, and therefore where another write may occur.

Figure 5:
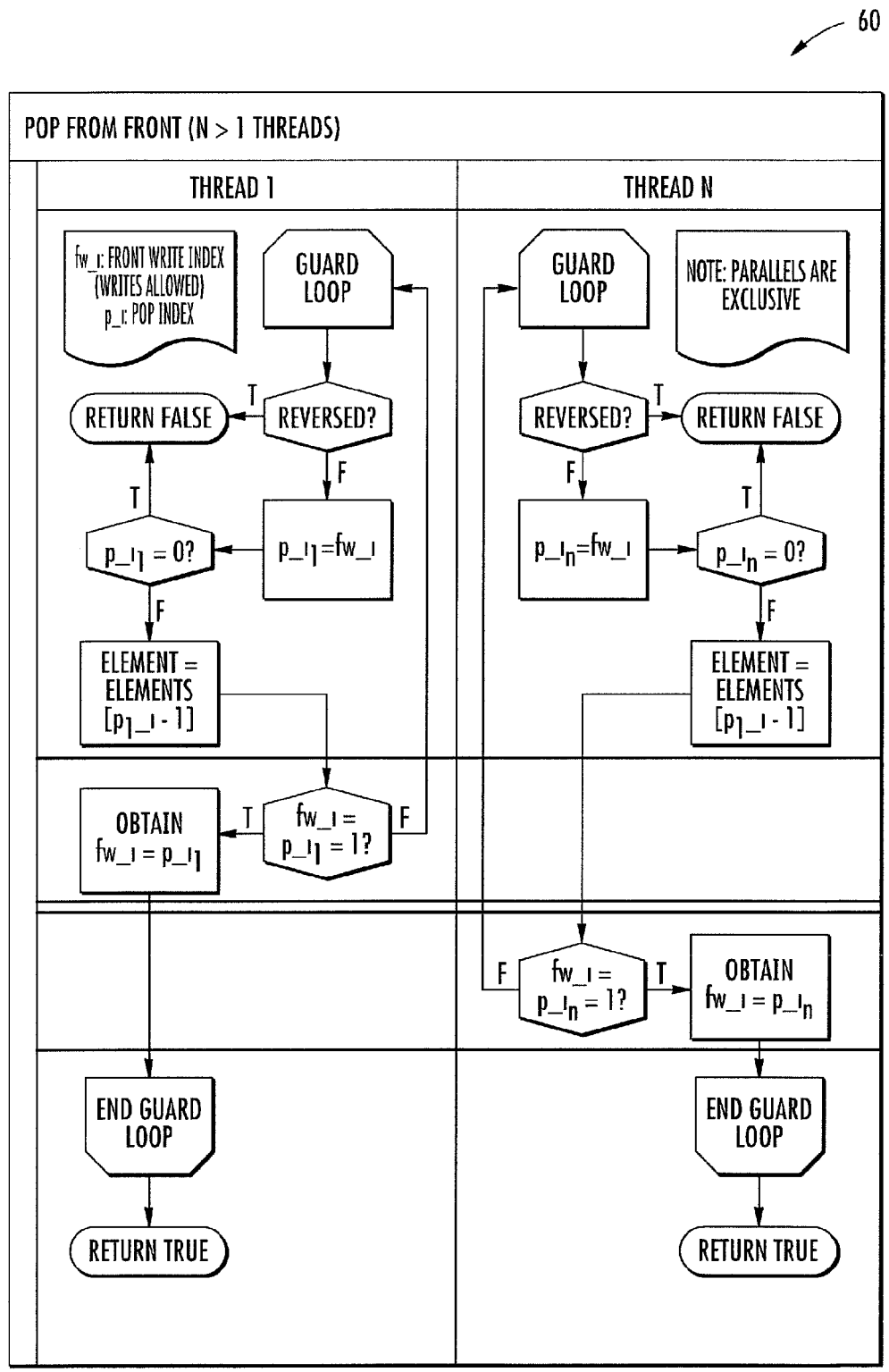
FIG. 5 is a flowchart showing one protocol while the reversing stack is popping from the front, according to the present invention.
Figure 6:
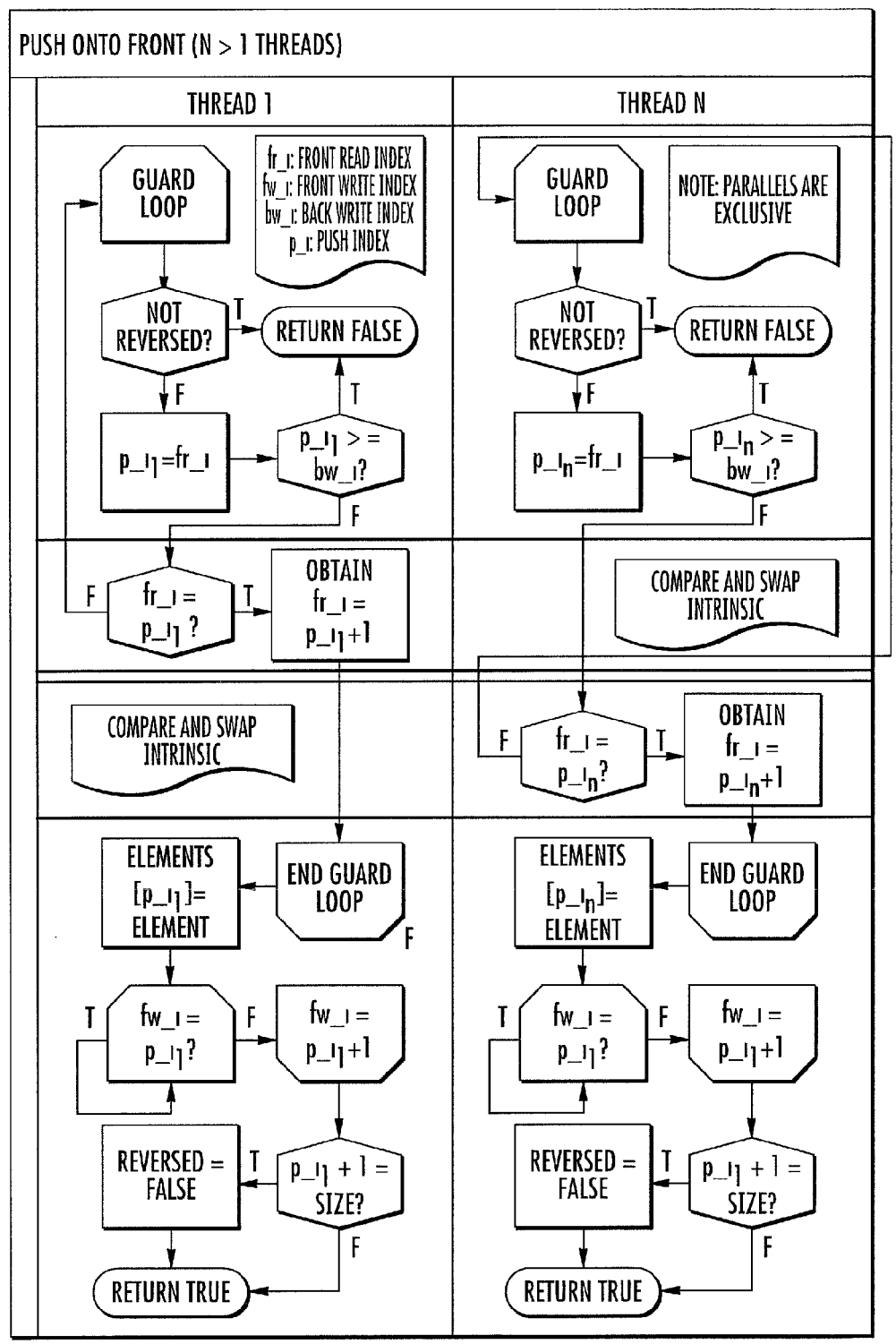
FIG. 6 is another flowchart of a protocol while the reversing stack is pushing onto the front, according to the present invention.
Figure 7:
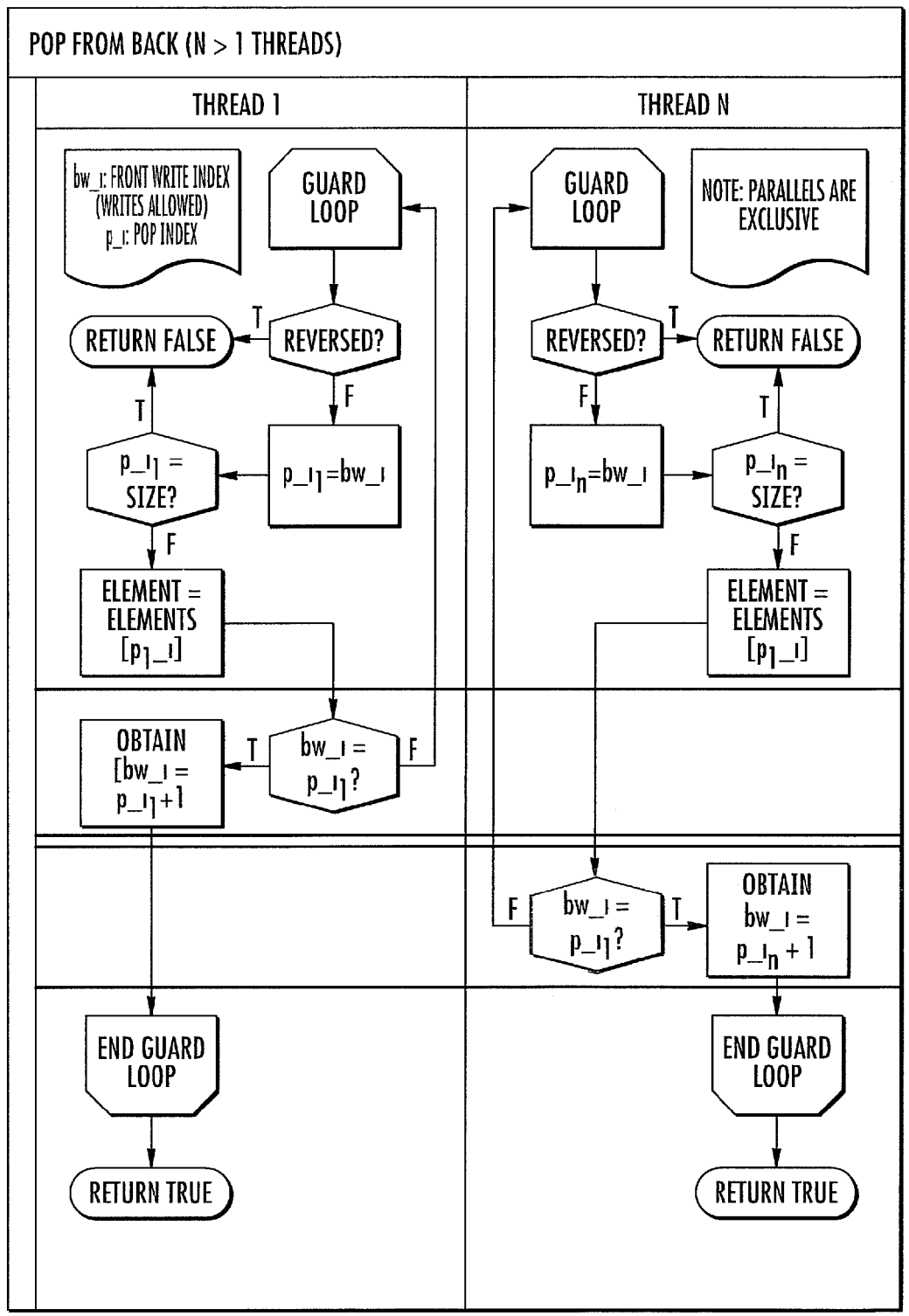
FIG. 7 is another flowchart of a protocol while the reversing stack is popping from the back, according to the present invention.
Figure 8:
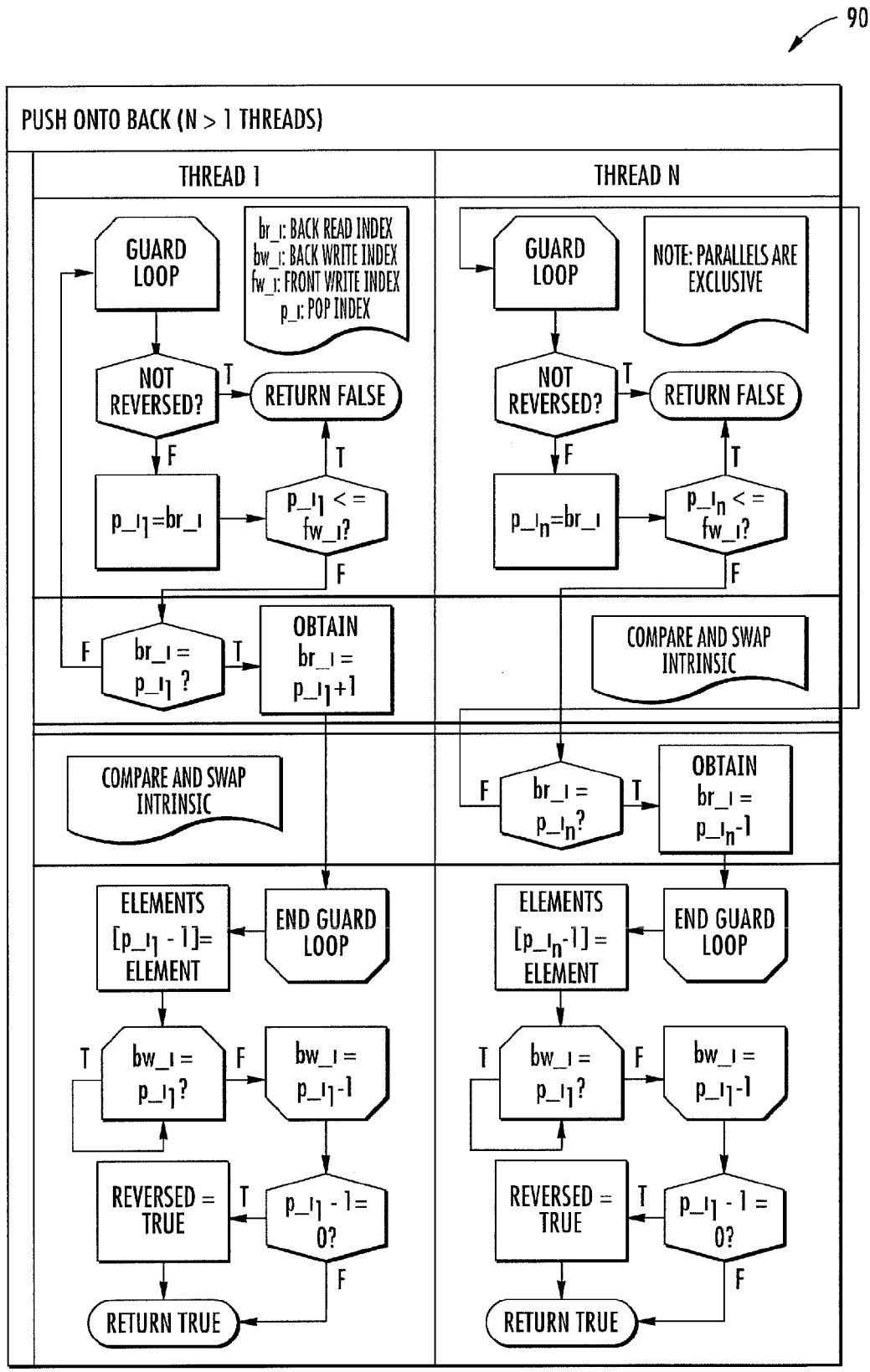
FIG. 8 is a flowchart of a protocol while the reversing stack is pushing onto the back, according to the present invention.

While not explained in detail, FIGS. 5-8 (diagrams 60, 70, 80, 90) offer illustrations of exemplar protocols of the push front 116, push back 117, pop back 119, and pop front 118 operations, which employ the reversing stack 100 protocol. FIG. 5 illustrates a pop 125 from the front 118, while FIG. 6 illustrates a push 115 onto the front 116. In addition, FIG. 7 illustrates a pop 125 from the back 119, while FIG. 8 illustrates a push 115 onto the back 117.

Useful Analogy

To use an analogy to building a condominium, further consider benefits derived from the present invention.

Regarding construction, do you build?
  a. one unit at a time as needed?
  b. one floor at a time as need is anticipated?
  c. the entire building?

Regarding the management of access to the building, do you:
  a. hire one security person who controls access to the door(s)?
  b. hire several security persons, each sharing a single key to the door(s)?
  c. install a keyless access system, and hire security staff as needed?

Typically, one would build the entire building at once, and manage access via keyless entry. This analogy maps to the reversing stack in the following way: The units correspond to portions of computer memory. The security persons correspond to running algorithms, or threads, that access the units, both individually and as a collection. The key is a synchronization mechanism, referred to more simply as a lock.

Computer programs manage data. It is common to manage data elements collectively rather than individually. These collections are called, alternatively, data containers. There are different types of containers, distinguished by how they manage membership in the collection. One such distinction is whether or not access to an arbitrary member of the collection at any given time is supported, or simply access to either or both ends (first or last members) of the collection. Lists belong to the former category, queues and stacks to the latter. Stacks provide access to member elements on a LIFO order.

All data containers need to manage both storage for constituent elements (condo units) and access to the collection (who guards the door). Concerning storage, some data containers reserve, or allocate, memory (units) as needed. They may do this either one unit at a time (a, above) or in small sets (b, above) as storage needs grow. This dynamic memory allocation introduces delays in populating or de-populating the container. For many performance-sensitive applications, this is unsatisfactory.

Concerning access, it is inefficient to have only one thread (one security person, as above described) controlling access to the container (building) if you have multiple producers and/or consumers of data (more than one door—for instance if you have a separate entrance and exit). Also, having multiple threads (doorpersons) is of little benefit if they must synchronize access (share one key; b, above). Obviously allowing simultaneous access to multiple threads (authorized persons) would be ideal.

Although certain combinations of options described above seem ridiculous, but for perhaps a few exceptional cases, they represent the norm of computer programming because both options (c above) have not previously been combined into one solution. Furthermore, programmers tasked with writing data-management algorithms have frequently chosen single-threaded access (one doorperson) due to the complexity of multi-threaded algorithms, particularly since access is serialized (one-at-a-time) by a shared lock anyway.

The reversing stack of the present invention provides a unique stack container implementation in that it allows concurrent, lock-free (unsynchronized) access on the part of multiple threads. The reversing stack is therefore much faster than existing stack implementations. No stack implementation that dynamically manages storage or otherwise requires synchronization will approach the speed (computing efficiency) of the reversing stack.

The reversing stack is fully lock-free. That is to say that it does not require synchronized access on the part of the programmer, nor does it incorporate or delegate to algorithms that require synchronization.

One innovation found in the reversing stack is the concept of directionality/orientation. By augmenting the concept of a stack in this way, and in conjunction with the so-called atomic CAS feature of modern computer processors, a stack sized to contain n elements supports simultaneous insertion (pushing) and extraction (popping) operations while guaranteeing sets of n elements are retrieved in LIFO order.

As will be appreciated by those skilled in the art, an exemplary implementation of the reversing stack 100 of the present invention is now described.

1. Software Patterns

In any marketplace, production efficiencies can provide a business with competitive advantages. Translated to the domain of computer software development, such efficiencies can be derived from the leveraging of proven algorithms. In the contemporary marketplace, these algorithms are sourced primarily in the form of open or commercial source code or binary components. Re-inventing the wheel, particularly with information assets such as computer software, can introduce inefficiencies and even deficiencies into software development processes and products.

2. Data Management

Selecting the mechanism(s) for data management is central to the design of software algorithms, both in terms of complexity and performance. Although the minimizing of software complexity has frequently outweighed the maximizing of computational efficiency, several factors are shifting such priorities. The increase in networked applications and the commoditization of software components have, for instance, generated an increased focus on producing fast and efficient software.

2.1 Primary Versus Non-Primary Storage

The algorithm introduced in this paper concerns that type of data management which transpires in primary storage (random access memory, or RAM) versus secondary or other forms of storage, such as a hard disk drive or remote/networked storage. More intuitively, this discussion deals with data that can be maintained or referenced by a variable in a computer programming language.

2.2 Program Languages: Data and Variables

Modern software programs are authored in (typically) one of many possible languages that are readable by both human and machine. The perspective in this paper issues from the C/C++ and assembly code languages. C++ is a strongly-typed language; i.e. variables are declared having both a name and a data-type, and may only contain (or reference) a value of this type.

We define a program variable as a named placeholder for a datum. A variable instance is an explicit portion of computer memory reserved for the purpose of containing some value.

We can, informally, think of a program as a set of variables and the operations performed upon them. Rudimentary operations are typically expressed and organized in units called functions; a function is named according to the higher-level operation(s) it performs.

If all data are known at software design time, we label such data management as static. If however, the software algorithm(s) must manage an unknown quantity of data, references to these data must be maintained by containers. We label such data management as dynamic.

2.3 Data Containers

The most basic type of data container is the array. In C/C++/assembler, an array is a contiguous section of computer memory (RAM) reserved for maintaining the discrete elements of the array. Although many C-like languages have dynamically-sized arrays (the number of elements can be changed during program execution), arrays as we consider them are fixed in length by the software author.

We refer to a data member of an array as an element. Conceptually, an array element is identical to a variable but referenced by the array-instance-name and element ordinal position pair (instead of merely by name).

A trivial approach to dynamically "re-sizing" an array is to introduce a variable that maintains the count of elements assigned to the array. The count is free to grow or shrink as long as it does not exceed the reserved size of the array. Given the obvious constraint of available RAM memory, such a container is not suitable to every container usage pattern.

2.3.1 Generic Containers

Generic containers are data containers suited to a wide variety of algorithms by virtue of their ability to manage arbitrary types of data. The qualifier "generic" is thus typically used in strongly-typed languages such as C++.

In the present discussion, generic containers are differentiated by the manner in which they manage data elements.

2.3.2 Standard C++ Containers

The Standard C++ Library (STL) provides a standardized set of generic containers and generic algorithms which operate upon them. Provided containers include the set (unique collection), vector (resizable array), list (random access collection), stack (last-in-first-out collection), and queue (first-in-first-out collection).

It is to be understood that, in C++, all member elements of a given stack instance must be of the same data type. This means that if, for instance, one wishes to track digits and characters, one would employ a digit stack and a character stack separately (if one needed to track a pair of these, this pair would itself become a data type).

All of these containers are, of course, ultimately built upon collections of variables, and possibly arrays. Furthermore, some of these variables are used to dynamically manage the memory required to track constituent data elements.

These containers differ in both the interfaces (operations) they present to the software author and the underlying mechanisms by which they manage data elements. Although more than one such container may function in a given scenario, typically one container will, according to the semantics of the scenario, outperform the others.

The containers provided by the STL are sufficiently comprehensive that the majority of software developers need no longer develop proprietary container implementations. However, as suggested earlier, the marketplace has evolved—the containers offered by the Standard C++ Library oftentimes do not meet performance requirements.

Performance improvements gleaned from the use of superior data container(s) can be dramatic, even making otherwise impractically slow algorithms viable.

2.3.3 Stack Containers

The particular type of container we consider in this paper is the stack. Stack containers afford the software developer a mechanism to collect data such that, when data is to be retrieved, retrieval occurs in last-in-first-out order (the element retrieved from the container is the one most recently added to it).

Placing data in the stack is referred to as a push, and removing data from the stack, a pop.

2.4 Software Concurrency

With the advent of multi-tasking operating systems (OS's), software development shifted from exclusive use to shared use of computer hardware resources. This, of course, includes primary storage. Thus, mechanisms for the efficient use and sharing of memory became an important aspect of software design. Additionally, the patterns of multi-tasking (the concurrent execution of multiple programs) evolved into those of multi-threading, in which a software program proceeds in multiple execution paths. Multi-threading software applications share computing resources internally, not merely with other programs.

2.5 Multi-Threaded Software

The primary advantage of multi-threaded application design is to allow concurrency within the application. Thus, one or more flows, or threads, of execution each manage a set of data via associated functionality and in a shared execution environment. The particulars of these data sets and functionality are, of course, application specific.

One key benefit of concurrency is non-blocking program behavior—when one thread is busy, perhaps waiting for a certain event or events to occur, other concurrent threads can continue to execute. A contemporary example of this would be the managing, by one thread, of a graphical user interface while a distinct thread or threads perform data processing. Another would be a given thread collecting, while one or more others perform processing of data. The ability afforded by threads to separate these algorithms can greatly simplify software development.

2.6 Synchronization

Although multi-threaded software can simplify application development, it also gives rise to specific challenges. Inter-thread communication and shared data management tasks frequently require that a thread access certain data exclusively at certain stages of execution. This coordination is effected through synchronization.

Synchronization can be thought of as forcing a thread to wait for some set of conditions to arise, usually through processing performed by a distinct thread or threads. Typically, data associated with these conditions are safeguarded via the exclusive acquisition of a synchronization object—a lock.

Contemporary computer operating systems frequently interrupt the execution of software threads. These thread interruptions and resumptions transpire as a part of OS scheduling. Synchronization relates directly to thread scheduling. Since scheduling lies within the domain of operating systems, thread synchronization mechanisms are provided by the host OS.

Scheduling implies that all threads are subject to interruption at any time, and during such an interruption, other threads may or may not be provided time to execute. Furthermore, the software author typically cannot predict when these interruptions will occur. These considerations impact when and how thread synchronization is performed.

Within a multi-threaded context, data container use must be synchronized in order to maintain algorithm coherency (in terms of states both internal and external to the container). Transitions between these states must take place in an ordered fashion; this ordering could be thwarted by thread scheduling unless properly synchronized.

In order to synchronize access to a data container, the programmer will typically associate a lock specifically with the container. Access to the container entails obtaining the lock, utilizing the container, and then releasing the lock. Synchronization consumes computing resources, including processing time; such resource costs vary according to both program state and the type and efficiency of the locks themselves.

Historically, software developers have not needed to concern themselves with low-level interactions between thread synchronization and scheduling performed by the OS. More recently, however, custom synchronization mechanisms have been developed and utilized by application software authors in order to realize performance and efficiency gains. These custom mechanisms often require a detailed understanding of OS and hardware performance characteristics.

2.7 Hardware Concurrency

Ideally, nuances of a software application's host computer hardware should be isolated from the application author. Certainly great variability exists, for instance, in the home personal computer marketplace, making this isolation a practical necessity. More specialized marketplaces or application requirements may limit this variety and therefore make platform-specific optimizations more practical.

Recently, use of computers that support true hardware concurrency has become widespread. By hardware concurrency we mean computer hardware that is capable of executing more than one thread in a given instant of time, not merely switching between them (however efficient the thread scheduler might be).

Computer hardware concurrency is realized through hyper-threading and multi-processing. Hyper-threading refers to the ability of a single physical processor to execute more than one thread at any given time; multi-processing is the use of multiple physical processors to execute computer software.

2.7.1 Multi-Processing

Multi-processing allows software execution to be distributed across multiple physical processors. These processors may or may not reside within one physical computer device or be distributed across networked devices. In this paper we limit consideration to the former.

We need not distinguish between multi and single processing and hyper-threading at length. Rather we observe simply that sharing computer resources, most particularly RAM, among processors may introduce significant hardware and OS complexity and computational overhead. Generally, such details do not impinge upon software development, however low-level and high-performance application development frequently must factor such artifacts and limitations into their design.

Noteworthy is an architectural detail of several multi-processor computing platforms: instruction re-ordering. Instruction re-ordering is a development in the field of CPU design that improves performance by allowing otherwise serialized instructions to execute concurrently. This concurrency adds another dimension of complexity to the implementation of synchronization mechanisms, and is a subject of ongoing research.

2.7.2 Memory Contention

At present, due to overhead involved in sharing resources (particularly memory), multi-processor computer systems do not scale linearly; that is, for instance, a doubling of the number of processors cannot be expected to double the computing efficiency of a system.

If a given software program is implemented with multiple threads, and these threads execute on multiple processors, the memory shared by the threads must be accessed by both processors. When two or more processors jointly attempt to modify the same memory location, or one attempts to read from the location as another attempts to modify it, these competing memory accesses must be arbitrated. The computational cost of this arbitration is called memory contention.

One may infer that memory contention impacts the performance of shared data container algorithms, and therefore the performance of all but the most trivial programs.

3. The Concurrency Problem: Complexity Versus Performance

With the above in mind, it is clear that multi-threaded programming poses significant challenges to optimizing software performance. This is true, for instance, in both in the design and use of programming languages. As such, many programmers have elected to reduce complexity at the cost of performance. One symptom of this is the use of exclusive locks in situations where exclusion may not strictly be necessary.

Obviously, as performance demands increase, there is greater pressure on software authors and vendors to achieve ever greater performance levels. As we have seen, however, these solutions can be expensive to implement, and can also introduce hard to find or reproduce bugs. For these reasons, an efficient multi-threaded data container is an important asset to many software projects.

3.1 Synchronization Overhead

When employing mutually-exclusive synchronization primitives, recall that the flow of execution is interrupted at the point of the lock request until such time as the lock can be obtained: until then such calls block a thread's execution. This process is not instantaneous if the lock is held elsewhere; in computational terms, the delay can be lengthy.

In considering the overhead an algorithm will incur on the part of synchronization mechanisms, one must not forget the overhead of invoking any function—and particularly an OS function—as it is not "free" time-wise. If the container source code is available (as is true of source code in general) to the software author, the invocation overhead of container operations can be largely eliminated.

3.2 Shared Synchronization Primitives

Whereas exclusive lock mechanisms introduce delays into program execution, another approach to locking was needed. If software designers partition data access logic into that which does and that which does not modify data, another locking technique is possible: the shared, or read-write lock.

Conceptually if, in a given context, a set of data needs no modification, the data may be considered constant and all threads may access it without locking. If, however, even a single thread can modify the data, all non-modifying threads must utilize a shared lock to prevent modification for the duration their respective accesses. Any thread performing data modification must hold an exclusive lock (exclusive to other readers and writers) for the duration of the access. This is the shared lock synchronization paradigm, and it can dramatically improve software performance in comparison to the casual use of exclusive locks.

3.3 Lock-Free Algorithms

The discussion of synchronization has thus far focused upon locks to protect shared data. Another technique for guaranteeing proper program behavior/state coherency employs lock-free algorithms. Plainly, if an algorithm can be constructed to avoid locking entirely, it can be expected to outperform those that involve locking.

If we revisit the topic of synchronization and why locking is necessary, we can reduce the problem to the following observation: the order of data modifications relative to other accesses or modifications must correspond to those intended by the algorithm issuing them. In multi-threaded software, and particularly on multi-processing systems, this ordering must, where appropriate, be accomplished through explicit synchronization. Given this, however, some algorithms or portions thereof can be crafted to maintain correct execution order without resorting to locks, either shared or exclusive. Such algorithms are to be lock-free.

Lock-free techniques avoid the expense of delegating synchronization responsibility to the OS. An application author has available to them nuanced details of a thread's state and can use this information to restrict, to very specific criteria, the conditions upon which a thread will yield. By contrast, securing an OS lock may well consume more processing resources than are necessary. If synchronization criteria can be reduced to the state of one or perhaps two variables, one can direct the processor to test and optionally modify these same without interruption, i.e. atomically.

3.4 Atomic Operations

Atomic operations offer the ability to perform certain simple computations on one or two variables. Correct use of these operations solves certain out-of-order memory access issues that would otherwise arise with multi-threaded or multi-processor systems.

Although implementation details vary on different processor architectures, key atomic operations are available to C++ programmers that use compilers maintained by Intel, Microsoft, Sun, and the open source community. Such operations include the ability to add or subtract, set, test, and compare variables.

Paired with other innovations, atomic operations have been leveraged to craft an efficient, lock-free data container; the Reversing Stack.

4. The Reversing Stack: High-Performance Data Management

The discussion so far has provided a foundation for understanding the need for efficient data management within computer software. Novel approaches to data management that demonstrate performance improvements represent, therefore, cost saving opportunities for innumerable performance-sensitive computing applications.

Popular stack and other data containers have prioritized simplicity and flexibility over performance. As such their implementation details have, broadly speaking, not factored concurrency into their design. Performance deficiencies in these offerings pose challenges to software developers. The Reversing Stack represents a solution to many of these challenges.

4.1 Concept

The Reversing Stack is, conceptually, a highly-efficient data container that offers a mode for FIFO and a mode for hybrid LIFO-FIFO data-ordering semantics. The latter mode may be thought of as a stack that adds orientation (reversed or not). Orientation allows the reversing stack, internally, to allow concurrent push and pop operations while yet maintaining LIFO semantics. By virtue of this fact, data can be managed internally via atomic operations and stack operations can be performed without locking on the part of the programmer.

An important aspect of the reversing stack is that it is not, strictly speaking, a LIFO container. The stack is LIFO between reversals. That is, an element popped off the stack is the one most recently pushed onto the stack prior to the most recent reversal. Thus, sets of elements—delimited by reversals—are FIFO, and the elements within such a set are LIFO, relative to one another. These reversals take place automatically during stack operation.

In the FIFO mode of operation, the reversing stack has broad utility as a high-performance queue data container. In the hybrid LIFO/FIFO mode of operation, the reversing stack is perfect for high-performance computing scenarios in which the client program requires data to be managed in discrete sets, with data insertion at arbitrary times and data retrieval proceeding upon the completion of such a set, in the order reverse that of insertion.

Finally, it must be understood that there is exactly one operation upon the stack that requires thread exclusivity: an explicit reversal. Thus it remains true that, although pops and pushes need not be synchronized relative to one another, they still must be guarded relative to an explicit stack reversal. These reversals are typically only necessary when retrieving elements comprising a partial set, such as when the program is shutting down.

4.2 Benefits

In single-threaded applications, performance gains can be realized from the efficiency of the reversing stack implementation. In multi-threaded operations, dramatic performance benefits arise from the ability to push and/or pop without mutual synchronization.

In terms of memory use, the reversing stack is more efficient than many data container implementations: if at most n elements are to be stored, then the memory requirements for the stack is fixed at n times the size of an element (in bytes), plus a few bytes for the several state variables and the reference to the element storage itself It is noteworthy that, during operation, the reversing stack does not perform dynamic memory allocation as this would limit performance to that of the system memory allocator (itself subject to locking issues). More subtly, by avoiding dynamic memory allocation, the reversing stack does not compete with other threads or processes for memory resources.

4.3 Possible Usage Scenarios

The reversing stack is useful as a high-performance data container where strict LIFO semantics are not required. Being compact and memory efficient, the Reversing Stack lends itself to usage scenarios that focus on compactness as well as performance, such as low-level or embedded system data management.

It is expected that the software developer "tune" stack size at design- or run-time according to the particular semantics of the client software in question.

4.3.1 Mixed Single/Multi-Threaded Pattern

While the reversing stack supports full concurrency (pushes, pops, or both), oftentimes applications do not need concurrency with both operations. For instance, an existing usage scenario performs single-threaded pops and multi-threaded pushes of internet connections. In this pattern, multi-threading specific portions of pop operation logic are unnecessary and thus elided, further improving performance.

4.3.2 Fixed-Limit Resource Allocator

Continuing with the above scenario, whereas there is a fixed upper bound on the number of connections the stack client (a web server) is configured to accommodate, the stack is dimensioned accordingly at application startup. Since there is always room on the stack for closed (returning) connections, logic safeguarding element storage becomes unnecessary. Removing this safeguard represents an optimization opportunity for this and similar usage scenarios. This pattern describes that of a high speed allocator—instead of connections, the stack could manage other resources, such as blocks of memory.

4.4 Implementation Details

Conceptually, the Reversing Stack is composed of an element array whose data accesses flow in alternating directions, based upon orientation. Internal state management (see FIG. 1) requires tracking the count of elements pushed (or popped) and thereby the index of element insertion and retrieval relative to the beginning of the array. In the multi-threaded version of the algorithm, these two indices are themselves split into a pair of variables: an acquire and release count.

Referring again to FIG. 1, additionally, there are three mask variables 203-205, each initialized once to perform their respective functions, outlined later in this document. The Reversing Stack maintains orientation internally via the push and pop count variables; orientation is inferred from the magnitudes of these. There are also a maximum index variable 201 and a spin variable 202. The maximum index is fixed as the zero-based index of the final array 101 element 170$n$, and is used in computing element indices from the counter variables 171-174. The spin variable is fixed as true or false, indicating whether or not conditional loops should spin (i.e. busy-loop) or yield (i.e. defer scheduled execution). Spinning is preferred in certain scenarios, most particularly in hardware-threaded execution contexts.

The three mask variables are used to partition (mask_number) the count variables into two sections, isolate (mask_index) the array index for the current set, and to count (mask_count) each set of elements as they are managed by the container. In hybrid mode, the Reversing Stack infers stack orientation from the mask_count variable.

Referring now to FIG. 2A, a diagram 20 shows the reversing stack offering operations expected of a queue or stack data container (FIG. 2): push, pop, and a test for being empty. Additionally, in hybrid mode, the Reversing Stack provides an operation to reverse the direction of data-flow (allow retrieval of an incomplete set of data elements).

Referring now to FIGS. 3-4, push and pop operations occur at their respective sections of the array, allowing data accesses (element pops and pushes) to proceed in the same direction (FIGS. 3$a$ and 3$b$). This uni-directionality enables atomic modification of state information and, therefore, lock-free operation.

As push and pop operations are required to be multi-threaded, the respective index is split into an acquire-release pair. This is done in order to "reserve" the next (read) element for a given thread, but prevent its value from being prematurely read or written until after the element value is assigned. Thus, the acquire index indicates the next available element to be read/written, while the release index indicates where the oldest such read/write has completed.

Note that an explicit reversal is not, intrinsically, an expensive operation: such a reversal is merely the adjustment of both the push and the pop counter variable pairs. Any performance cost stems from the synchronization needed to ensure that no pushes or pops are transpiring during the reversal.

algorithms are difficult because of the dynamicity of the variables being managed. Thus, in order to maintain a correct internal state, the algorithm advances in three distinct sections.

Nuances of the push operation are now considered, however note pop operation logic is, essentially, identical but for the transposition of count variables and the reading, rather than writing, of data elements.

TABLE 2

| | Push Operation Pseudo-Code | |
|---|---|---|
| 1 | | bool function push (in-element) |
| 2 | (A) Loop while acquiring slot position; if | do { |
| 3 | the container is full, return indicating | set push-count to push-acquire-count; |
| 4 | element not pushed. | if container is full { |
| 5 | At completion of this loop (and in | return false; |
| 6 | conjunction with C, below), we have a | } |
| 7 | slot unique to this thread | set pushed index to index portion of pushed-count; |
| 8 | | set pushing-count to next push-count; |
| 9 | | } while test-and-set push-acquire-count from pushed-count to pushing-count is false; |
| 10 | (B) Assign the value (push writes, pop | set element at pushed-index to in-element; // * |
| 11 | reads). | // * for FIFO mode; at pushed-index or maximum-index |
| | Ensure proper memory ordering where | - pushed-index for LIFO/FIFO mode |
| 12 | necessary. | // store fence on appropriate platforms |
| 13 | (C) Wait for earlier pushes to complete, | while (push count != pushed count) { |
| 14 | then update the count of elements | if (! spins) yield; |
| 15 | pushed to indicate completion of this | } |
| 16 | push operation. | set push count to pushing count; |
| 17 | | return true; |

4.5 Benchmark Example Usage Pattern

Figure 9:
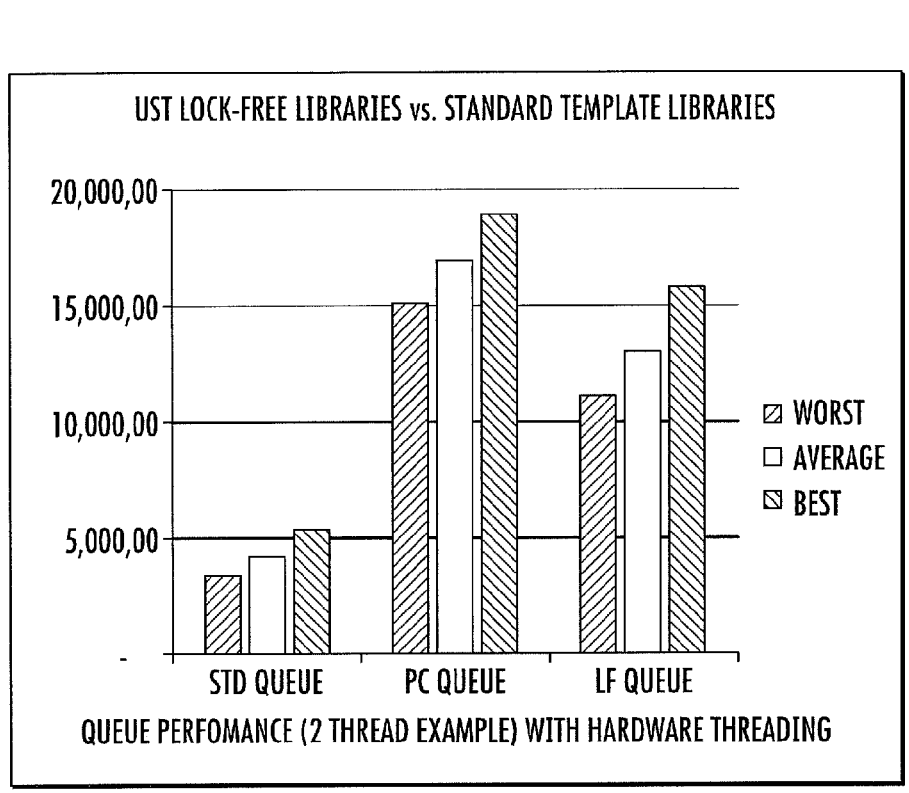
FIGS. 9-10 are charts illustrating performance of the data container of the present invention and of the prior art.
Figure 10:
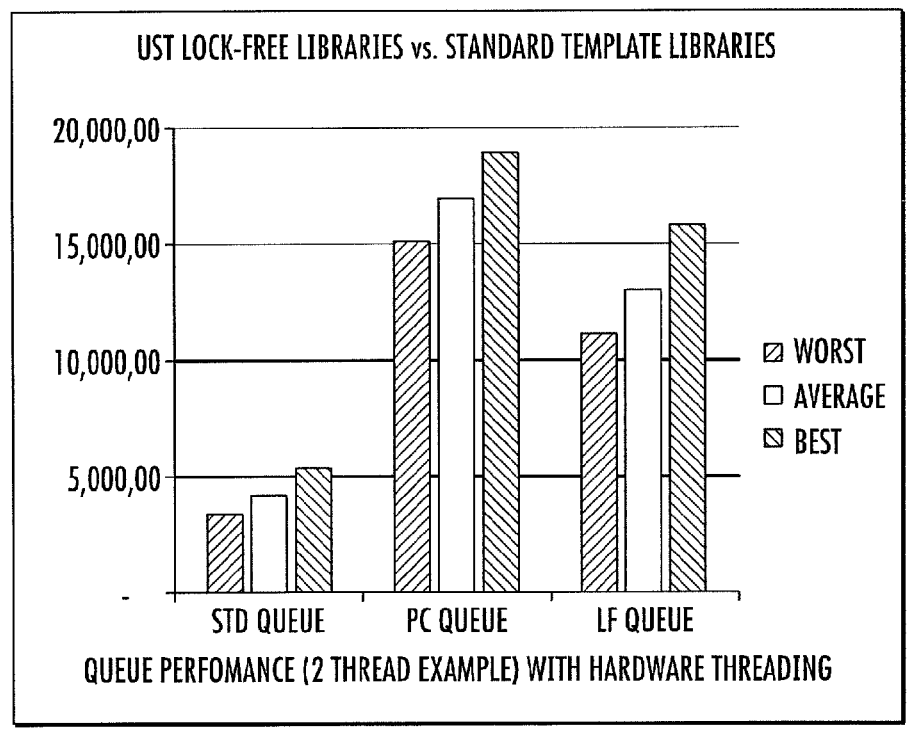

Referring now to FIGS. 9-10, in the following graphs 200, 210, the advantages offered by the reversing stack data container are clear. The chart represents benchmark results from a modern, multi-core (hardware threaded) IBM PC compatible computer. A conventional queue (synchronized with a critical section) is compared against specialized and generalized forms of the reversing stack operating in FIFO mode.

The left-most results represent the performance of a standard C++ queue (STD Queue) synchronized with a critical section (a relatively efficient thread synchronization mechanism). The producer-consumer queue (specialized form of the Reversing Stack) operates with one pushing and one popping thread. The lock-free queue (generalized form of the Reversing Stack) operates with any number of pushing and popping threads.

The benchmark measures the iterations per second for 100,000 push and pop cycles of a randomly computed number. The following table summarizes the benchmark results in numerical form (values rounded to nearest 50,000 iterations/second):

TABLE 1

Performance (2 threads) with Hardware Threading

| | STD Queue | PC Queue | LF Queue |
|---|---|---|---|
| Worst | 3,600,000 | 15,250,000 | 11,400,000 |
| Average | 4,300,000 | 17,150,000 | 13,250,000 |
| Best | 5,500,000 | 19,200,000 | 15,950,000 |

4.6 Algorithm Details

The complexity of the Reversing Stack algorithm lies not in the logic of reading or writing datum to the correct slot of the array, but rather in the aspect of concurrency. Lock-free The first of these sections (A) embodies logic to ensure that the container is not full (a free slot can be acquired) before proceeding. There are two possible outcomes. If it is determined that the container is full, the operation returns with a value of false, indicating the data element was not inserted into the container. Otherwise, the test-and-set intrinsic will, if the acquire count is identical to the count determined in the body of the loop, alter it accordingly. Should the acquire count have changed before the intrinsic, another iteration of the loop is performed.

With a successful test-and-set, the algorithm proceeds to the next section (B). It is at this point that we consider the A-B-A problem, and how the algorithm compensates for it. At the outset of section B, there are two possible states—not one—regarding the availability of the acquired slot. The expected, typical state finds the acquired slot "empty"—the existing value has already been consumed with a pop operation. However, due to the A-B-A problem, a second possible state finds the acquired slot still possessing an unconsumed value.

To illustrate this second scenario, consider an example of a container with n total slots. A thread under consideration acquires one of these slots, but between the safeguard condition and the test-and-set intrinsic of section A (some multiple of) n pushes occur with only sufficient pops to leave the slot full. The acquired slot remains indicated for element insertion, however the algorithm has "committed" to pushing the data element. Doing so before the value of the slot in question is popped constitutes an error.

There are two solutions offered. The first is to insert another loop at the beginning of (B) that, if necessary, blocks progress until an element is popped. Once this occurs, and whereas this free slot is uniquely held by the thread in question, assignment can proceed.

The second solution is to utilize the maximum range of values for the count variables (from which a slot position is derived), thus ensuring that the likelihood of the second scenario is so reduced in degree that thread scheduling precludes the possibility. Remembering the mask variables, defined above, the range of values given an n-sized container is computed as follows:

Let a be the bus width of the host computer (32 or 64 bits, typically)

Let b be the power of the smallest power-of-two number larger than n

The range of values of a count variable is $2^{(a-b)}*n$.

For example, the range of values for a container sized to hold 1000 elements and hosted on a 32-bit computer is $2^{(32-11)}*1000=2,097,152,000$. In other words, for a false test-and-set to occur, thread scheduling would need to yield a scenario in which some multiple of 2,097,152,000 push operations transpired between the guard condition and the test-and-set intrinsic. Modern schedulers provide time-slice guarantees such that this becomes a practical impossibility.

If both of these mechanisms are used together, we not only prevent the scenario from occurring but also effectively eliminate the expense of the additional guard loop. The third section (C) serializes updating of the release count. Recalling the purpose of this count is to indicate the completion of each push operation, these must proceed in-turn.

Figure 11:
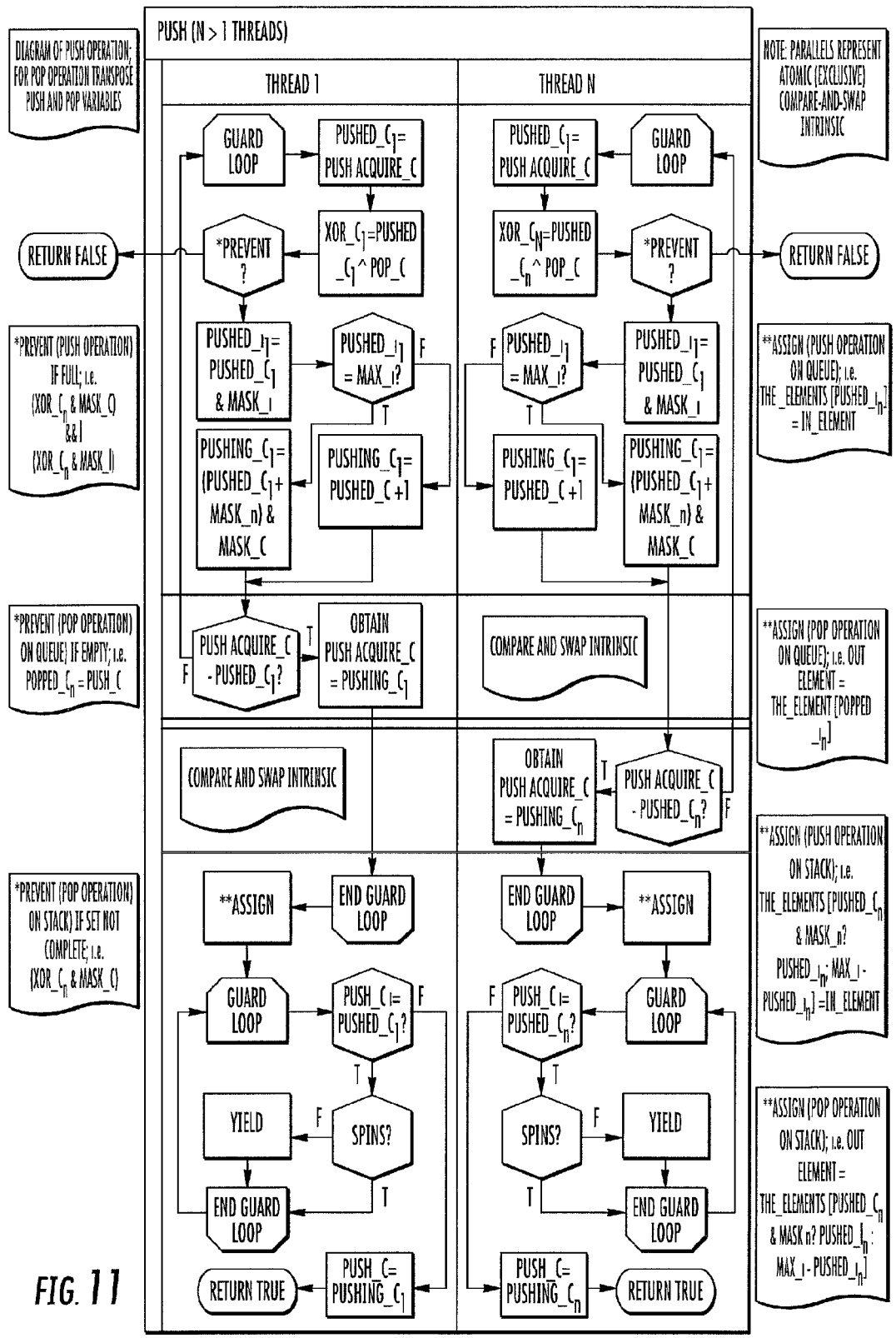
FIG. 11 is a detailed flowchart of the push protocols, according to the present invention.

Referring now to FIG. 11, a diagram 250 illustrates that the pop protocol differs from the push protocol primarily in which of the two sets of counter variables 171-174 are interpreted and modified. Accordingly, FIG. 11 indicates these protocol differences in relation to the one flowchart.

```
Benchmark Pattern Source Code Listing
//
DWORD WINAPI PopThreadProc (
    LPVOID lpParameter // _in LPVOID lpParameter
)
{
    ShortStack& The_ShortStack = * static_cast<ShortStack
*>(lpParameter);
    ::InterlockedIncrement(&startedThread_count);
    ::WaitForSingleObject(BeginEvent_HANDLE, INFINITE);
    while (! shutdownRequested)
    {
        ShortStack::element the_element;
        bool popped;
        ::AcquireSRWLockShared(&The_SRWLOCK);
        do if ((popped = The_ShortStack.pop(the_element)))
        {
            ::InterlockedIncrementAcquire(&pop_count);
            ::InterlockedExchangeAdd64(&pop_total, the_element);
        } while (popped && ! shutdownRequested);
        ::ReleaseSRWLockShared(&The_SRWLOCK);
        if (! popped)
        {
            if (The_ShortStack.rempty( )) ::SwitchToThread( );
            else
            {
                ::AcquireSRWLockExclusive(&The_SRWLOCK);
                if (The_ShortStack.empty( )) { ++ reversal_count;
The_ShortStack.reverse( ); }
                ::ReleaseSRWLockExclusive(&The_SRWLOCK);
            }
            ::InterlockedIncrementAcquire(&failedPop_count);
        }
    }
    return 0;
}
//
Push example usage pattern:
//
DWORD WINAPI PushThreadProc (
    LPVOID lpParameter // _in LPVOID lpParameter
)
{
    ShortStack& The_ShortStack = * static_cast<ShortStack
*>(lpParameter);
    ::InterlockedIncrement(&startedThread_count);
    ::WaitForSingleObject(BeginEvent_HANDLE, INFINITE);
    while (! shutdownRequested)
    {
        ShortStack::element the_element;
        bool pushed;
        ::AcquireSRWLockShared(&The_SRWLOCK);
        the_element = ::rand( ) & 0x00FF;
        do if ((pushed = The_ShortStack.push(the_element)))
        {
            ::InterlockedIncrementAcquire(&push_count);
            ::InterlockedExchangeAdd64(&push_total, the_element);
            the_element = ::rand( ) & 0x00FF;
        } while (pushed && ! shutdownRequested);
        ::ReleaseSRWLockShared(&The_SRWLOCK);
        if (! pushed)
        {
            ::InterlockedIncrementAcquire(&failedPush_count);
            ::SwitchToThread( );
        }
    }
    return 0;
}
//
```

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
    a memory; and
    a processor coupled to said memory for storing and accessing data in said memory;
    said processor for
        arranging the data in a stack data container comprising a plurality of values extending from a stack top to a stack bottom,
        operating the stack data container in first and second modes of operation,
        while in the first mode, pushing and popping a respective value from the stack top of the stack data container,
        while in the second mode, reversing an orientation of the stack data container and the plurality of values therein, and pushing and popping a respective value from the stack bottom of the reversed stack data container,
        storing a first plurality of values in the stack data container during the first mode and maintaining a first pair of indices for reading values from and a second pair of indices for writing values to stack locations associated with the first plurality of values, and
        storing a second plurality of values in the stack data container during the second mode and maintaining a first pair of indices for reading values from and a second pair of indices for writing values to stack locations associated with the second plurality of values.

2. The electronic device of claim 1 wherein said processor reverses the stack data container a plurality of times.

3. The electronic device of claim 2 wherein said processor stores a first set of values in the stack data container before a first reversal; and wherein said processor subsequently retrieves the first set of values based upon a last-in and first-out (LIFO) out protocol.

4. The electronic device of claim 3 wherein said processor stores a second set of values in the stack data container between the first reversal and a second reversal different from the first reversal; and wherein said processor subsequently retrieves values from the second set of values based upon a first-in first-out (FIFO) protocol.

5. The electronic device of claim 1 wherein said processor stores and maintains a plurality of variables associated with a current orientation of the stack data container.

6. The electronic device of claim 1 wherein the first and second pairs of indices are for indicating locations of recent pushed and popped values for the first and second modes for the stack data container; and wherein said processor uses the first and second pairs of indices to determine data occupancy at a given stack location.

7. The electronic device of claim 1 wherein in the first mode, a push operation adds values relative to the stack top by advancing a first push index, writing to a first resultant stack location, then advancing a second push index; wherein, in the first mode, a pop operation retrieves values relative to the stack top by advancing a first pop index, reading from a second resultant stack location, then advancing a second pop index; and wherein, in the second mode, the push operation adds values relative to the stack bottom by advancing the first push index, writing to a third resultant stack location, then advancing the second push index; and wherein, in the second mode, the pop operation retrieves values relative to the stack bottom by advancing the first pop index, reading from a fourth resultant stack location, then advancing the second pop index.

8. The electronic device of claim 1 wherein said processor stores the stack data container in a fixed length array in said memory.

9. The electronic device of claim 1 wherein said processor comprises a plurality of cores, each core operating a respective thread for accessing the stack data container, the stack data container permitting concurrent access thereto by said plurality of cores.

10. The electronic device of claim 9 wherein each core accesses the stack data container without synchronization locks; and wherein the stack data container compensates for the pointer recycling (ABA) problem independent of stack length.

11. A non-transitory computer-readable medium having computer-executable instructions for causing a computing device comprising a processor and associated memory to perform steps comprising:
   storing and accessing data in the memory;
   arranging the data in a stack data container comprising a plurality of values extending from a stack top to a stack bottom;
   operating the stack data container in first and second modes of operation;
   while in the first mode, pushing and popping a respective value from the stack top of the stack data container;
   while in the second mode, reversing an orientation of the stack data container and the plurality of values therein, and pushing and popping a respective value from the stack bottom of the reversed stack data container;
   storing a first plurality of values in the stack data container during the first mode and maintaining a first pair of indices for reading values from and a second pair of indices for writing values to stack locations associated with the first plurality of values; and
   storing a second plurality of values in the stack data container during the second mode and maintaining a first pair of indices for reading values from and a second pair of indices for writing values to stack locations associated with the second plurality of values.

12. The non-transitory computer-readable medium of claim 11 wherein said processor and associated memory reverse the stack data container a plurality of times.

13. The non-transitory computer-readable medium of claim 12 wherein said processor and associated memory store a first set of values in the stack data container before a first reversal; and wherein said processor and associated memory subsequently retrieve the first set of values based upon a last-in and first-out (LIFO) out protocol.

14. The non-transitory computer-readable medium of claim 13 wherein said processor and associated memory store a second set of values in the stack data container between the first reversal and a second reversal different from the first reversal; and wherein said processor and associated memory subsequently retrieve values from the second set of values based upon a first-in first-out (FIFO) protocol.

15. The non-transitory computer-readable medium of claim 11 wherein said processor and associated memory store and maintain a plurality of variables associated with a current orientation of the stack data container.

16. The non-transitory computer-readable medium of claim 11 wherein the first and second pairs of indices are for indicating locations of recent pushed and popped values for the first and second modes of operation for the stack data container; and wherein said processor uses the first and second pairs of indices to determine data occupancy at a given stack location.

17. The non-transitory computer-readable medium of claim 11 wherein in the first mode, a push operation adds values relative to the stack top by advancing a first push index, writing to a first resultant stack location, then advancing a second push index; wherein, in the first mode, a pop operation retrieves values relative to the stack top by advancing a first pop index, reading from a second resultant stack location, then advancing a second pop index; and wherein, in the second mode, the push operation adds values relative to the stack bottom by advancing the first push index, writing to a third resultant stack location, then advancing the second push index; and wherein, in the second mode, the pop operation retrieves values relative to the stack bottom by advancing the first pop index, reading from a fourth resultant stack location, then advancing the second pop index.

18. The non-transitory computer-readable medium of claim 11 wherein said processor and associated memory store the stack data container in a fixed length array in said memory.

19. The non-transitory computer-readable medium of claim 11 wherein said processor comprises a plurality of cores, each core operating a respective thread for accessing the stack data container, the stack data container permitting concurrent access thereto by said plurality of cores.

20. The non-transitory computer-readable medium of claim 19 wherein each core accesses the stack data container without synchronization locks; and wherein the stack data container compensates for the pointer recycling (ABA) problem independent of stack length.

* * * * *